United States Patent
Israr et al.

(10) Patent No.: US 9,588,588 B2
(45) Date of Patent: Mar. 7, 2017

(54) CUSTOMIZED HAPTIC EFFECTS

(71) Applicant: Disney Enterprises, Inc., Burbank, CA (US)

(72) Inventors: Ali Israr, Monroeville, PA (US); Roberta Klatzky, Pittsburgh, PA (US); Siyan Zhao, Pittsburgh, PA (US); Jill Fain Lehman, Pittsburgh, PA (US); Oliver Schneider, Vancouver (CA)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/590,879

(22) Filed: Jan. 6, 2015

(65) Prior Publication Data

US 2016/0085303 A1 Mar. 24, 2016

Related U.S. Application Data

(60) Provisional application No. 62/053,534, filed on Sep. 22, 2014.

(51) Int. Cl.
*G08B 6/00* (2006.01)
*G06F 3/01* (2006.01)
*H04N 21/426* (2011.01)
*H04N 21/485* (2011.01)

(52) U.S. Cl.
CPC ........... *G06F 3/016* (2013.01); *H04N 21/426* (2013.01); *H04N 21/485* (2013.01)

(58) Field of Classification Search
CPC .................................. G06F 3/016; H04M 1/23
USPC ...................................................... 340/407.2
See application file for complete search history.

(56) References Cited

U.S. PATENT DOCUMENTS

| | | | | |
|---|---|---|---|---|
| 2006/0288137 A1* | 12/2006 | Grant | ...................... | G06F 3/016 710/62 |
| 2007/0057913 A1* | 3/2007 | Eid | ......................... | G06F 3/016 345/156 |
| 2009/0091479 A1* | 4/2009 | Sinha | ..................... | G06F 3/016 341/22 |
| 2009/0189873 A1* | 7/2009 | Peterson | ............. | G06F 3/03547 345/173 |
| 2010/0171715 A1* | 7/2010 | Peterson | ................. | G06F 3/016 345/173 |

(Continued)

OTHER PUBLICATIONS

Jongeun Cha, "A Framework for Haptic Broadcasting", vol. 16, Issue: 3, Sep. 2009, pp. 16-27.

(Continued)

*Primary Examiner* — Don N Vo
(74) *Attorney, Agent, or Firm* — Farjami & Farjami LLP

(57) ABSTRACT

There is provided a system and method for producing a haptic effect. In one implementation, such a system includes a system processor, a system memory, and a haptic engine stored in the system memory. The system processor is configured to execute the haptic engine to receive a media content, to map an event contained in the media content to a predetermined haptic effect, and to display an interface enabling a system user to produce a customized haptic effect based on the predetermined haptic effect. The system processor is further configured to generate an output data for causing one of the predetermined haptic effect and the customized haptic effect to occur.

17 Claims, 5 Drawing Sheets

(56) References Cited

U.S. PATENT DOCUMENTS

2013/0246222 A1* 9/2013 Weerasinghe ......... G06Q 30/02 705/26.62

OTHER PUBLICATIONS

Angela Chang, "Audio-Haptic Feedback in Mobile Phones", CHI 2005, pp. 1264-1267.
Fabien Danieau, "Toward Haptic Cinematography: Enhancing Movie Experience with Haptic E_ects based on Cinematographic Camera Motions", IEEE 2014, pp. 1-19.
Mario J. Enriquez, "The Hapticon Editor: A Tool in Support of Haptic Communication Research", 2003, pp. 1-7.
Helen Farley, "A quest for the Holy Grail: Tactile precision, natural movement and haptic feedback in 3D virtual spaces", 2009, pp. 285-295.
Yu Gao, "MPEG-V Based Web Haptic Authoring Tool", 2013, pp. 87-91.
Ali Israr, "Surround Haptics: Sending Shivers Down Your Spine", Aug. 2011, p. 1.
Ali Israr, "Feel Effects: Enriching Storytelling with Haptic Feedback", Sep. 2014, pp. 1-17.
Jaeha Kim, "Signal Processing: Image Communication", 2013, pp. 151-161.
Jaebong Lee, "Real-Time Perception-Leve Translation from Audio Signals to Vibrotactile Effects", CHI 2013, pp. 2567-2576.
Sile O'odhrain, "Touch TV: Adding Feeling to Broadcast Media", 2004, pp. 1-7.
Myongchan Kim, "Saliency-Driven Real-Time Video-to-Tactile Translation", Jan. 2014, p. 1-12.
Ramon Latorre, "Nature", vol. 221, Mar. 8, 1969, pp. 963-964.
Oliver S. Schneider, "Improvising Design with Haptic Instument", Feb. 2014, pp. 327-332.
Hasti Seifi, "End-user Customization of Affective Tactile Massages: A Qualitative Examination of Tool Parameters", pp. 251-256.
Colin Sindells, "Medium Fidelity Rapid Prototyping of Vibrotactile Haptic, Audio and Video Effects", Feb. 2014, pp. 515-521.
Markus Waltl, "A Toolset for the Authoring, Simulation, and Rendering of Sensory ExperienCes", Oct. 29, 2012, pp. 1469-1472.

* cited by examiner

US 9,588,588 B2

CUSTOMIZED HAPTIC EFFECTS

RELATED APPLICATIONS

The present application claims the benefit of and priority to a Provisional Patent Application Ser. No. 62/053,534, filed Sep. 22, 2014, and titled "Crafting Personalized Tactile Experience for Entertainment and Social Media," which is hereby incorporated fully by reference into the present application.

BACKGROUND

Much of the media content presently available to consumers, such as entertainment content in the form of music, videos, and games, for example, can be provided as highly immersive, multimodal sensory experiences, using state of the art visual, sound and tracking systems. However, and despite the recognized potential for haptic feedback to further enhance the experience of consumers of these types of media content, haptic effects have heretofore been provided as an adjunct to media content in a relatively limited and inflexible manner. Furthermore, despite the proliferation of personal computing and communication devices enabling consumers to continuously interact with various types of media content while working, studying, exercising, or performing errands, for example, there is no infrastructure presently available to allow those consumers to create, modify, and share haptic effects associated the media content they enjoy.

Haptic technology, or haptics, is a tactile feedback technology, which recreates a sense, such as a sense of touch by generating or applying haptic effects, e.g. forces, vibrations or motions to a user. It has been described as doing for the sense of touch what computer graphics does for vision. Haptic devices may also incorporate tactile sensors that measure forces exerted by the user on the interface.

When compared with so much of the available technology enabling consumers to interact with and use highly sophisticated electronic devices, conventional approaches for producing haptic effects have developed relatively slowly, and typically require the use of expert codes and the participation of experienced and proficient hapticians. These constraints imposed on the authoring of haptic effects have tended to hinder their wider application to the range of media content enjoyed by consumers. Moreover, the present lack of an authoring infrastructure designed to enable average consumers and other novice users to create, modify, and share haptic effects undesirably prevents those consumers and novice users from engaging with available media content in a more creative and participatory way.

SUMMARY

There are provided systems and methods for producing customized haptic effects, substantially as shown in and/or described in connection with at least one of the figures, and as set forth more completely in the claims.

DETAILED DESCRIPTION

Figure 1:
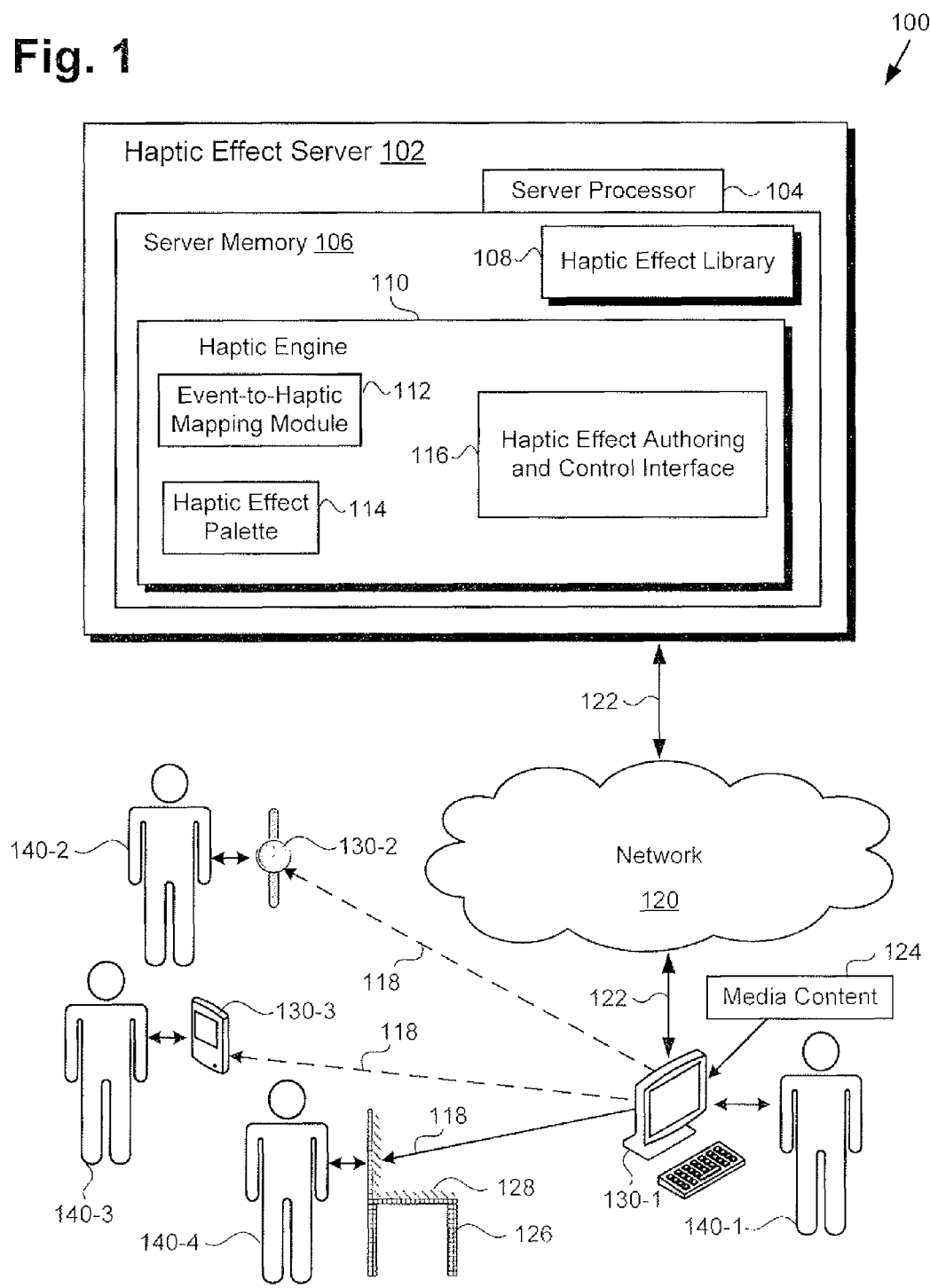
FIG. 1 shows a diagram of an exemplary system configured to produce customized haptic effects, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As explained above, when compared with the available technology enabling consumers to interact with and use highly sophisticated electronic devices, conventional approaches for producing haptic effects have developed relatively slowly, and typically require the use of expert codes and the participation of experienced and proficient hapticians. Those constraints imposed on the authoring of haptic effects have hindered their wider application to the range of media content enjoyed by consumers. As also explained above, the present lack of an authoring infrastructure designed to enable average consumers and other novice users to create, modify, and share haptic effects undesirably prevents those consumers and novice users from engaging with available media content in a more creative and participatory way.

The present application discloses a system and method that utilizes a shared online library of tactile content (haptic content hereinafter referred to as "haptic effects") and associates media content and user activities to dynamic, expressive, and user specific haptic effects. The solution disclosed in the present application allows average consumers of media content and novice users of such media content to readily and intuitively produce new customized haptic effects, as well as to tune, modify, save, and share those customized haptic effects with other users.

The present solution includes display of an authoring interface providing sliders, knobs, and buttons enabling modification of the type, intensity, or duration of haptic effects using descriptive common language and/or intuitive visual images, such as readily identifiable icons, to identify the nature and degree of the modifications being produced. In response to inputs from a user modifying one or more haptic effects using the provided common language or visual descriptors to identify the nature of the modification, the present solution transforms those common language based inputs into output data for causing the haptic effect or effects to occur. As a result, average consumers and novice users, such as gaming enthusiasts, students of all ages, and technologically naïve adults, for example, can engage a wide variety of media content in a participatory and creative way. It is noted that the customized haptic effects produced by the systems and according to the methods disclosed in the present application can be applied to vibrotactile arrays, force-feedback, and other haptic feedback technologies.

FIG. 1 shows a diagram of exemplary system 130-1 configured to produce customized haptic effects, according to one implementation. As shown in FIG. 1, system 130-1 for producing customized haptic effects is situated within haptic effect production environment 100 including haptic effect server 102, communication network 120, media content 124, personal communication devices 130-2 and 130-3, and chair 126 equipped with haptic surface or pad 128. As further shown in FIG. 1, system 130-1 is utilized by system user 140-1, while other users 140-2 and 140-3 utilize respective personal communication devices 130-2 and 130-3, and other user 140-4 utilizes chair 126 with haptic surface or pad 128.

It is noted that haptic surface or pad 128 can include one or more actuators, such as vibrotactile actuators, for example, configured to cause a customized haptic effect to occur. In addition, any or all of system 130-1 and personal communication devices 130-2 and 130-3 may be equipped with one or more actuators configured to cause the customized haptic effect to occur. Moreover, in some implementations, haptic surface or pad 128 may be a peripheral component of system 130-1 and may thus be defined as being part of system 130-1.

Haptic effect server 102 includes server processor 104, and server memory 106 storing haptic effect library 108 and haptic effect engine 110 including event-to-haptic mapping module 112, haptic effect palette 114, and haptic effect authoring and control interface 116. Also shown in FIG. 1, network communication links 122 interactively connects system 130-1 and haptic effect server 102 via communication network 120, and output data 118 is transmitted by system 130-1 to each of personal communication devices 130-2 and 130-3, as well as to haptic surface or pad 128.

It is noted that output data 118 may be transmitted wirelessly, as represented by the dashed lines depicting transfer of output data 118 to personal communication devices 130-2 and 130-3, or by a wired connection, as represented by the solid line depicting transfer of output data 118 to haptic surface or pad 128. It is further noted that the communication links shown in FIG. 1 have been selected for display in the interests of conceptual clarity, and are not intended to depict all possible communication links. For example, it is understood that in addition to the communication links shown explicitly in FIG. 1, each of personal communication devices 130-2 and 130-3 may be interactively linked to communication network 120 by respective network communication links corresponding to network communication link 122.

According to the implementation shown by FIG. 1, system user 140-1 may utilize system 130-1 to interact with haptic effect server 102 over communication network 120, for example to access haptic effect library 108 and/or to download haptic engine 110 to system 130-1. In one such implementation, haptic effect server 102 may correspond to one or more web servers, accessible over a packet network such as the Internet, for example. Alternatively, haptic effect server 102 may correspond to one or more servers supporting a local area network (LAN), or included in another type of limited distribution network.

Although system 130-1 for producing customized haptic effects is shown as a personal computer (PC) workstation in FIG. 1, this representation is provided merely as an example. In other implementations, system 130-1 may be another type of personal communication device, such as either of personal communication devices 130-2, depicted as smartwatch 130-2, or personal communication device 130-3, depicted as smartphone 130-3. Other examples of personal communication devices suitable for use as system 130-1 can include a gaming console, a digital media player, or a tablet computer, among others.

According to the implementation shown in FIG. 1, system user 140-1, who may be an average consumer or novice user, for example, utilizes system 130-1 to produce customized haptic effects based on media content 124 received by system 130-1. Media content 124 may be content distributed over communication network 120 as audio, and/or still image, and/or video content. For example media content 124 may include social media content, or streaming or downloaded entertainment content in the form of music, movies, or games. Alternatively, media content 124 may be audio and/or video content stored on and received by system 130-1 from a computer readable non-transitory medium, such as a physical medium in the form of a Universal Serial Bus (USB) drive, memory stick, or optical disc for example.

Figure 2:
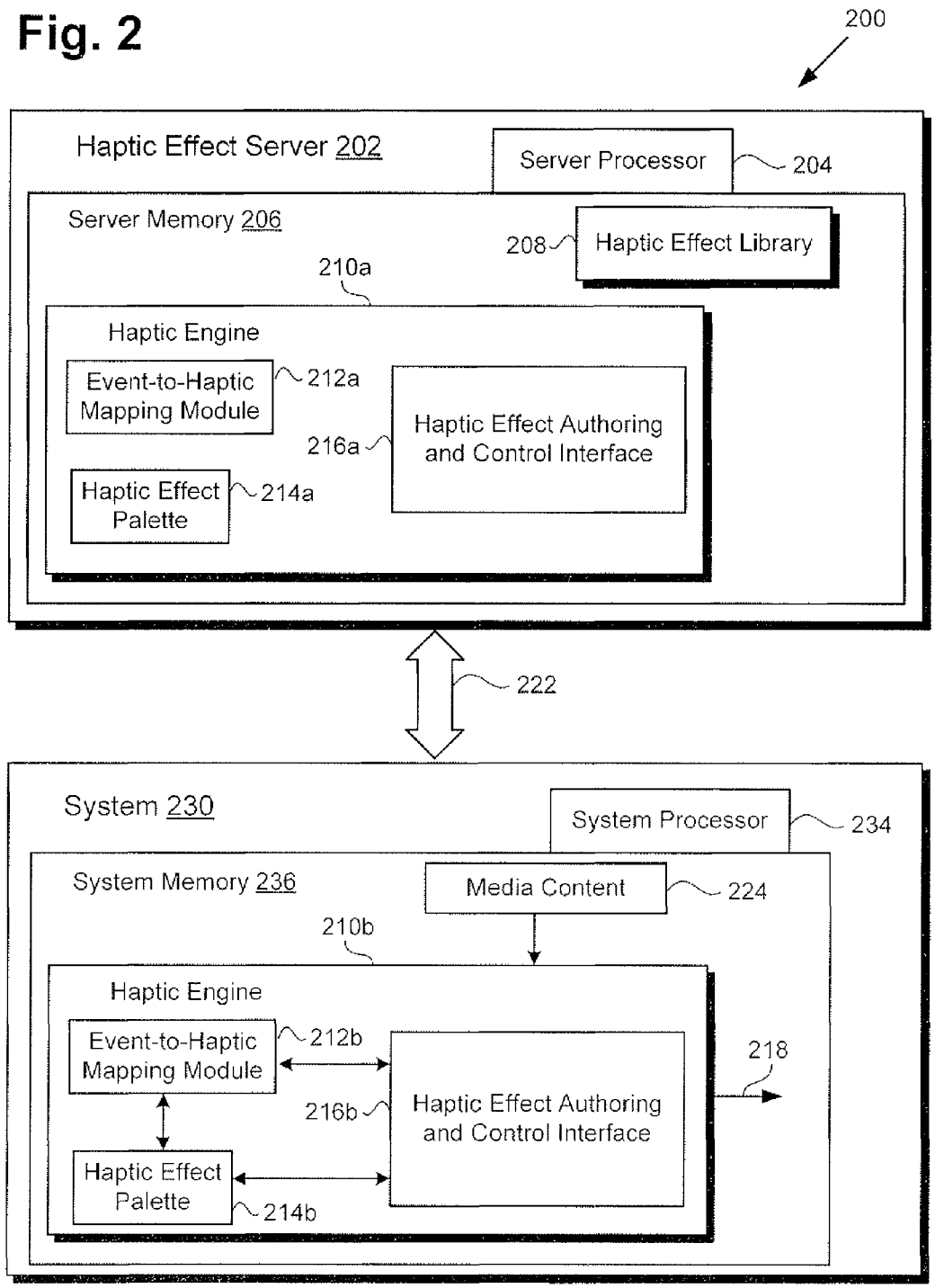
FIG. 2 shows another exemplary implementation of a system configured to produce customized haptic effects.

Referring to FIG. 2, FIG. 2 shows a more detailed exemplary implementation of system 230 configured to produce customized haptic effects. Haptic effect production environment 200 in FIG. 2 includes system 230 interactively connected to haptic effect server 202 over network communication link 222. System 230 corresponds in general to any of system 130-1 or personal communication devices 130-2 and 130-3, in FIG. 1. As shown in FIG. 2, system 230 includes system processor 234, and system memory 236 storing haptic engine 210*b* including event-to-haptic mapping module 212*b*, haptic effect palette 214*b*, and haptic effect authoring and control interface 216*b*. Also shown in FIG. 2 is media content 224 corresponding in general to media content 124 in FIG. 1, and being received as an input by haptic engine 210*b*, and output data 218 generated by haptic engine 210*b*.

Network communication link 222, and Haptic effect server 202 including server processor 204 and server memory 206 correspond in general to network communication link 122, and haptic effect server 102 including server processor 104 and server memory 106, in FIG. 1. Moreover, haptic effect library 208, and haptic engine 210*a* including event-to-haptic mapping module 212*a*, haptic effect palette 214*a*, and haptic effect authoring and control interface 216*a*, in FIG. 2, correspond respectively to haptic effect library 108, and haptic engine 110 including event-to-haptic mapping module 112, haptic effect palette 114, and haptic effect authoring and control interface 116, in FIG. 1.

According to the exemplary implementation shown in FIG. 2, haptic engine 210*b* including event-to-haptic mapping module 212*b*, haptic effect palette 214*b*, and haptic effect authoring and control interface 216*b* is located in system memory 206, having been received from haptic effect server 202 via network communication link 222. In one implementation, network communication link 222 corresponds to transfer of haptic engine 210*b* including event-to-haptic mapping module 212*b*, haptic effect palette 214*b*, and haptic effect authoring and control interface 216*b* over a packet network, for example. Once transferred, for instance by being downloaded over network communication link 222 haptic engine 210*b* including event-to-haptic mapping module 212*b*, haptic effect palette 214*b*, and haptic effect authoring and control interface 216*b* may be persistently stored in system memory 236 and may be executed locally on system 230 by system processor 234.

System processor 234 may be the central processing unit (CPU) for system 230, for example, in which role system processor 234 runs the operating system for system 230 and executes haptic engine 210b. In the exemplary implementation of FIG. 2, a system user, such as system user 140-1, or either of other users 140-2 and 140-3 can utilize system 230 to produce customized haptic effects based on events contained in media content 234. In other words, system processor 234 can be configured to execute haptic engine 210b to receive media content 224, and to map an event contained in media content 224 to a predetermined haptic effect available from haptic effect palette 214b using event-to-haptic mapping module 212b. In addition, system processor 234 can be configured to execute haptic engine 210b to display haptic effect authoring and control interface 216b, which is configured to enable modification of the predetermined haptic effect by the system user.

System processor 234 can be configured to further execute haptic engine 210b to modify the predetermined haptic effect according to an input received from the system user so as to produce a customized haptic effect, and to generate output data 218 for causing the customized haptic effect to occur. Referring to FIG. 1 and FIG. 2 in combination, for example, system processor 234 can execute haptic engine 210b to provide output data 118 to one or more actuators included as part of personal communication device 130-2 and/or personal communication device 130-3 and/or haptic surface or pad 128, for causing the customized haptic effect to occur.

Figure 3:
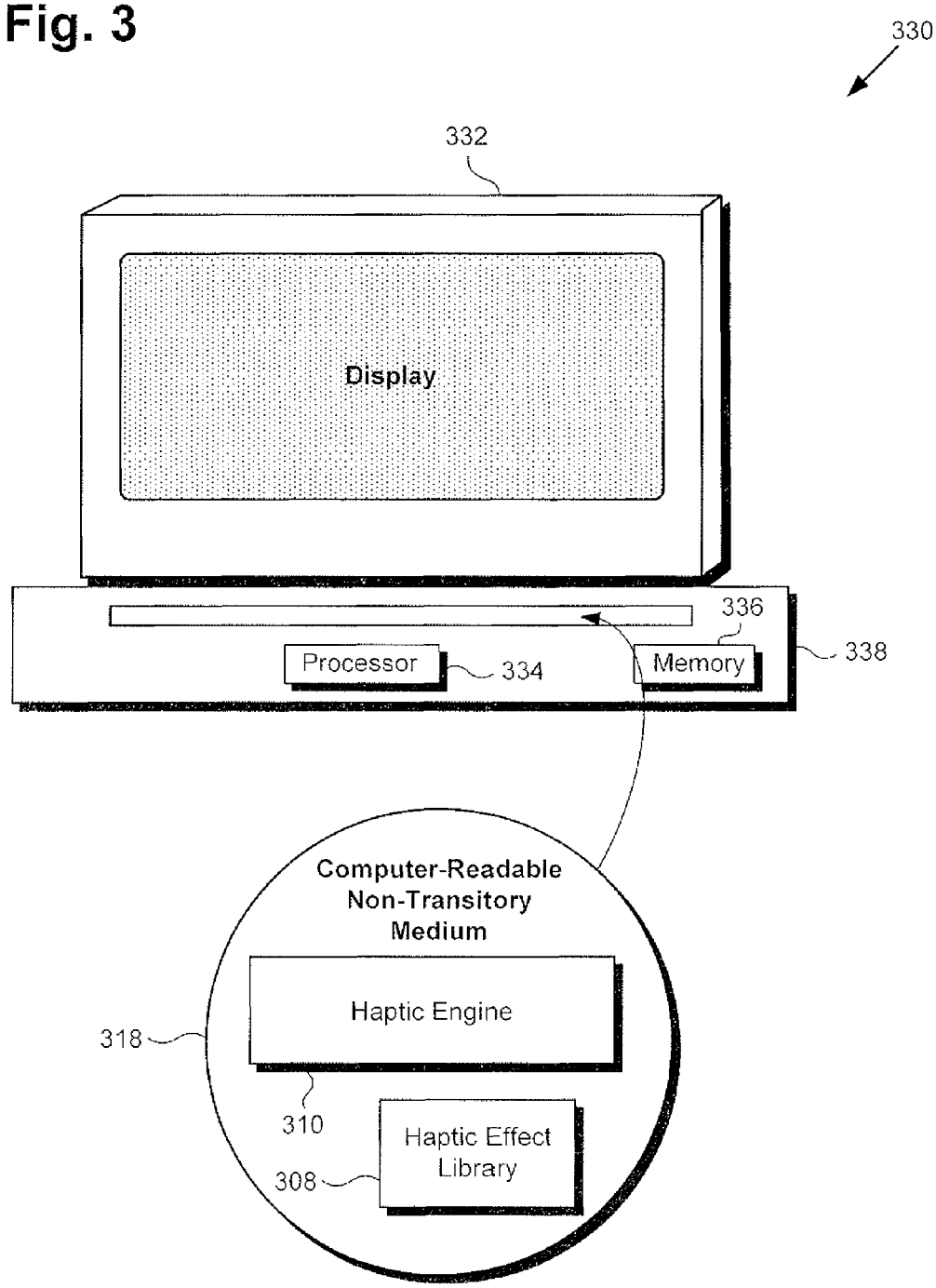
FIG. 3 shows an exemplary system and a computer-readable non-transitory medium including instructions enabling production of customized haptic effects, according to one implementation.

Moving now to FIG. 3, FIG. 3 shows an exemplary system and a computer-readable non-transitory medium including instructions enabling production of customized haptic effects, according to one implementation. System 330, in FIG. 3, includes computing unit 338 including processor 334 and memory 336, interactively linked to display 332. Display 332 may comprise a liquid crystal display ("LCD"), a light-emitting diode ("LED"), an organic light-emitting diode ("OLED"), or another suitable display screen that performs a physical transformation of signals to light.

Also shown in FIG. 3 is computer-readable non-transitory medium 318 having haptic engine 310 and haptic effect library 308 stored thereon. System 330 including processor 334 and memory 336 corresponds in general to any or all of system 130-1, in FIG. 1, personal communication devices 130-2 and 130-3 in that same figure, and to system 230 including system processor 234 and system memory 236, in FIG. 2. For example, in some implementations, processor 334 corresponding to system processor 234 may be part of a personal communication device.

The expression "computer-readable non-transitory medium," as used in the present application, refers to any medium, excluding a carrier wave or other transitory signal, that provides instructions to processor 334 of computing unit 338. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown by FIG. 3, computer-readable non-transitory medium 318 provides haptic engine 310 for execution by processor 334 of computing unit 338. Haptic engine 310, when executed by processor 334, instantiates a haptic engine on system 330 corresponding to haptic engine 210b, in FIG. 2, and capable of performing all of the operations attributed to haptic engine 210b by the present disclosure. It is noted that although FIG. 3 shows computer-readable non-transitory medium 318 as including haptic effect library 308, that depiction is merely by way of example. In other implementations, haptic effect library 308 may not be present on computer-readable non-transitory medium 318, but may be accessible to system 330 over a communication network corresponding to communication network 120, in FIG. 1. For example, referring to FIG. 1, in some implementations, haptic effect library 108 accessible on haptic server 102 may be utilized by system 330 in lieu of haptic effect library 308.

Figure 4:
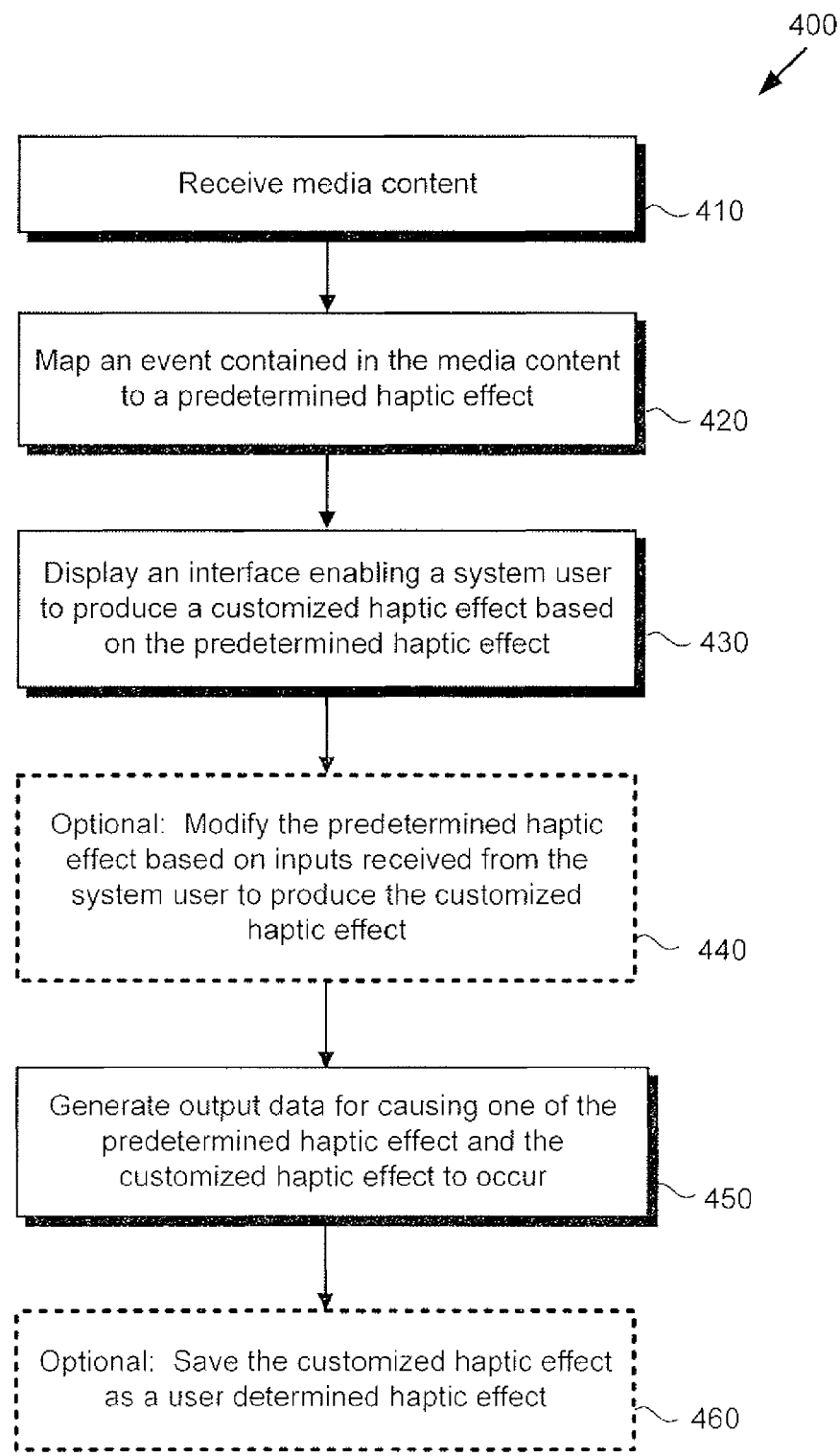
FIG. 4 is a flowchart presenting an exemplary method for use by a system to produce customized haptic effects.
Figure 5:
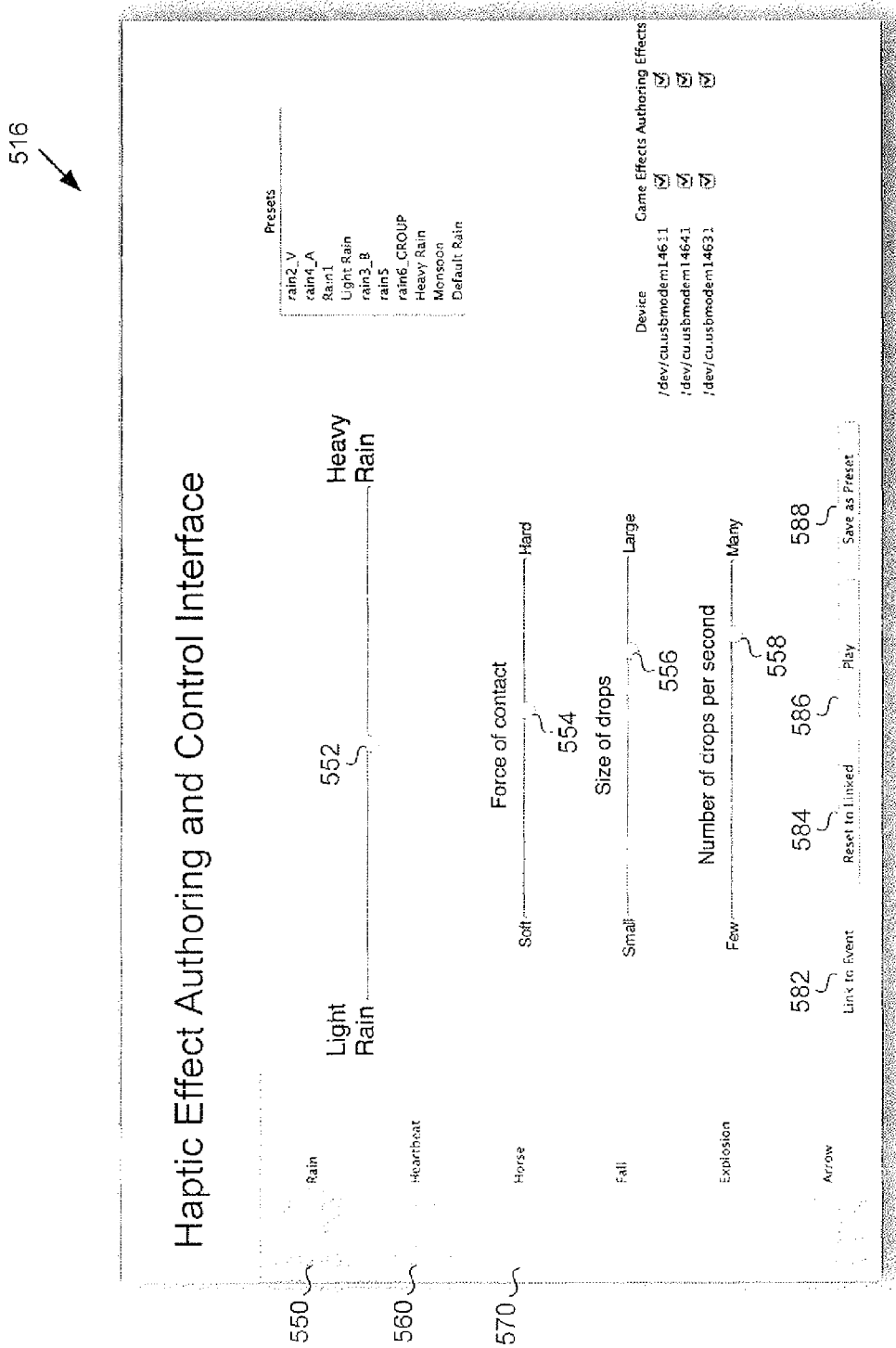
FIG. 5 shows an exemplary representation of a user interface enabling an average consumer or other novice user to produce customized haptic effects.

Example implementations of the present disclosure will now be further described with reference to FIG. 4 and FIG. 5. FIG. 4 is a flowchart presenting an exemplary method for use by a system to produce customized haptic effects, while FIG. 5 shows an exemplary representation of a user interface enabling an average consumer or other novice user to produce customized haptic effects. FIG. 5 shows haptic effect authoring and control interface 516 displaying icons 550, 560, and 570 corresponding to families of predetermined haptic effects, and controls 552, 554, 556, and 558 for modifying a predetermined haptic effect. In addition, haptic effect authoring and control interface 516 includes command bars 582, 584, 586, and 588 enabling a system user to produce a customized haptic effect by creating a new haptic effect or by modifying a predetermined haptic effect.

Referring to FIG. 4 in combination with FIG. 1 and FIG. 2, flowchart 400 begins with receiving, by haptic engine 210b being executed by system processor 234, media content 224 (action 410). As noted above by reference to corresponding media content 124, in FIG. 1, media content 224 may be content distributed over communication network 120 as audio, and/or still image, and/or video content. For example media content 224 may take the form of social media content including text and/or images, or may be streaming or downloaded entertainment content in the form of music, movies, or games. Alternatively, media content 224 may be audio, and/or still image, and/or video content stored on and received by system 230 from a computer readable non-transitory medium, such as system memory 236, or an external physical medium in the form of a USB drive, memory stick, or optical disc for example. In addition, in some implementations, media content 224 may include sensor data, such data produced by an accelerometer, for example.

Flowchart 400 continues with mapping an event contained in media content 224 to a predetermined haptic effect (action 420). Mapping of an event contained in media content 224 to a predetermined haptic effect can be performed by haptic engine 210b executed by system processor 234, and may include use of event-to-haptic mapping module 212b and haptic effect palette 214b, for example. Haptic effect palette 214b may include some, all of, or more than the haptic effects accessible on haptic effect library 108 of haptic effect server 102. The haptic effects available through haptic effect palette 214b may include predetermined haptic effects provided by a creator of haptic effect library 108. In addition, the haptic effects available through haptic effect palette 214b may further include predetermined haptic effects originally produced as customized haptic effects by system user 140-1, or other users 140-2 or 140-3 utilizing respective personal communication devices 130-2 and 130-3, and saved to haptic effect palette 214b as user determined haptic effects.

The events contained in media content 224 may be identified through association with one of a family of predetermined haptic effects included in haptic effect palette 214*b*. For example, the occurrence of rainfall as an event in media content 224 may be associated with several specific predetermined haptic effects corresponding to rainfall and grouped as a family of predetermined haptic effects associated with rainfall, such as heavy rain, light rain, high or low frequency rain, or rain in the form of large or small rain drops.

Other families of predetermined haptic effects may be associated with events in media content 224 corresponding to the sound of a heartbeat, the appearance of a horse or horses in media content 224, a fall by a character appearing in media content 224, an explosion, or the use of an arrow or other projectile, to name a few examples. Accordingly, in one implementation, event-to-haptic mapping module 212*b* may be configured to identify a family of predetermined haptic effects associated with each event in media content 224, and to further map each event to a particular predetermined haptic effect included in the associated family.

Referring to FIG. 5 in conjunction with all previous figures, flowchart 400 continues with displaying haptic authoring and control interface 216*b*/516 enabling modification of the predetermined haptic effect by system user 140-1 (action 430). Displaying of haptic authoring and control interface 216*b*/516 can be performed by haptic engine 210*b* executed by system processor 234, and may include use of display 332. As shown in FIG. 5, haptic authoring and control interface 516 presents rainfall icon 550, heartbeat icon 560, and horse icon 570, as well as icons representing a fall by a character, an explosion, and an arrow or other projectile, as described above.

It is noted that rainfall icon 550, heartbeat icon 560, and horse icon 570, as well as other icons displayed using haptic authoring and control interface 516 may be representative of families of predetermined haptic effects that can be associated with particular events contained in media content 224. Thus, horse icon 570, for example, may represent the family of predetermined haptic effects including substantially all predetermined haptic effects having to do with a horse, horses, or horseback riding.

As further shown by FIG. 5, haptic authoring and control interface 516 includes controls 552, 554, 556, and 558 enabling system user 140-1 to produce a customized haptic effect based on a predetermined haptic effect, such as through modification of the predetermined haptic effect, for example. According to the specific example shown in FIG. 5, a predetermined haptic effect included in the family of predetermined haptic effects represented by rainfall icon 550 is displayed and may be modified by system user 140-1. For instance, system user 140-1 can change the haptic effect mapped to a rainfall event along a continuum from light to heavy rain using slider control 552. In addition, system user 140-1 can modify the force of rain from soft to hard, the size of raindrops from small to large, and number of rain drops per second from few to many using respective slider controls 554, 556, and 558.

Flowchart 400 may continue with modifying the predetermined haptic effect, e.g., rainfall in FIG. 5, according to an input received from system user 140-1 to produce a customized haptic effect based on the predetermined haptic effect (action 440). Modifying the predetermined haptic effect can be performed by haptic engine 210*b* executed by system processor 234, through use of haptic authoring and control interface 216*b*/516. System user 140-1 may produce the customized haptic effect by temporarily or persistently linking the modifications made utilizing one or more of controls 552, 554, 556, and 558 with the particular media content event mapped to the predetermined haptic effect. For example, system user 140-1 can utilize one of command bars 582, 584, 586, or 588 to affect modification of the predetermined haptic effect.

It is noted that in some instances, the predetermined haptic effect may not be modified, due, for example, to absence of inputs from system user 140-1 commanding such a modification being received through haptic authoring and control interface 216*b*/516. In those situations, action 440 may be omitted, and the present method may proceed from action 430 directly to action 450 described below. It is further noted that in some implementations, in addition to enabling system user 140-1 to produce a customized haptic effect by modify a predetermined haptic effect, the present method may further enable system user 140-1 to modify the mapping criteria utilized in action 420. For example, in some implementations, haptic engine 210*b* executed by system processor 234 may be further configured to enable system user 140-1 to modify mapping criteria imposed by event-to-haptic mapping module 212*b* when mapping an event contained in media content 224 to a predetermined haptic effect.

Flowchart 400 may continue with generating, by haptic engine 210*b* executed by system processor 234, output data 118/218 for causing the customized haptic effect to occur (action 450). As noted above by reference to FIG. 1 and FIG. 2, for example, system processor 234 can execute haptic engine 210*b* to provide output data 118/218 to one or more actuators included as part of personal communication device 130-2 and/or personal communication device 130-3 and/or haptic surface or pad 128, and configured to cause the customized haptic effect to occur.

It is noted that in implementations in which the predetermined haptic effect to which an event contained in media content 224 is mapped in action 420 is not modified by system user 140-1, action 450 may include generating output data 118/218 for causing that predetermined haptic effect to occur. Thus, more generally, flowchart 400 includes generating, by haptic engine 210*b* executed by system processor 234, output data 118/218 for causing one of the predetermined haptic effect and the customized haptic effect to occur as action 450.

Referring to FIG. 5, it is noted that controls 552, 554, 556, and 558, and command bars 582, 584, 586, and 588 enable system user 140-1 to affect modifications to a predetermined haptic effect using descriptive common language familiar to an average consumer or novice user. Moreover, rainfall icon 550, heartbeat icon 560, and horse icon 570, enable system user 140-1 to affect modifications to a predetermined haptic effect through the use of intuitive visual images that are readily recognizable to an average consumer or novice user. In other words, haptic authoring and control interface 216*b*/516 enables an average consumer or novice user to identify the nature and degree of desired modifications through the use of descriptive common language and/or intuitively recognizable visual imagery, and transforms inputs based on such language and/or imagery into output data 118/218 for causing the predetermined haptic effect or customized haptic effect to occur.

Exemplary flowchart 400 may conclude with optionally saving the customized haptic effect as a user determined haptic effect (action 460). Saving the customized haptic effect as a user determined haptic effect may be performed by haptic engine 210*b* executed by system processor 234, through use of haptic effect palette 214*b*, for example. In one implementation, the customized haptic effect can be saved as a user defined haptic effect saved for the future as a newly predetermined haptic effect available as part of haptic effect palette 214*b*. Moreover, in some implementations, the user determined haptic effect can be uploaded to haptic effects library 108/208 accessible over communication network 120. In those implementations, the uploaded user determined haptic effect can be made available as a newly predetermined haptic affect for download and use by another user, such as other users 140-2 and/or 140-3.

Thus, the present application discloses systems and methods for producing customized haptic effects that utilize an authoring and control interface enabling modification of the type, intensity, or duration of predetermined haptic effects through the use of descriptive common language and/or intuitively recognizable visual images. In response to inputs from a system user for modifying a haptic effect using the provided common language or visual descriptors to identify the nature of the modification, the present solution transforms those common language or visual imagery based inputs into output data for causing the haptic effect to occur. As a result, average consumers and novice users, such as gaming enthusiasts, students of all ages, and technologically naïve adults can advantageously engage a wide variety of media content in a participatory and creative way.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system configured to produce a haptic effect, the system comprising:
    a system processor;
    a system memory; and
    a haptic engine stored in the system memory;
    wherein the system processor is configured to execute the haptic engine to:
        receive, by the haptic engine, a media content having one or more audio or video events;
        obtain at least one of the one or more audio or video events from the media content;
        map the at least one of the one or more audio or video events to a predetermined haptic effect;
        display an interface enabling a system user to produce a customized haptic effect based on the predetermined haptic effect mapped to the at least one of the one or more audio or video events; and
        generate an output data for causing one of the predetermined haptic effect and the customized haptic effect to occur.

2. The system of claim 1, wherein the system processor is further configured to execute the haptic engine to enable the system user to save the customized haptic effect as a user determined haptic effect.

3. The system of claim 2, wherein the system processor is further configured to execute the haptic engine to enable the system user to upload the user determined haptic effect to a haptic effects library accessible over a network.

4. The system of claim 1, further comprising at least one actuator for creating the one of the predetermined haptic effect and the customized haptic effect, wherein the system processor is further configured to execute the haptic engine to provide the output data for use by the at least one actuator configured to cause the one of the predetermined haptic effect and the customized haptic effect to occur.

5. The system of claim 1, wherein the system comprises a personal communication device.

6. The system of claim 1, wherein the system is one of a personal computer (PC) and a gaming console.

7. The system of claim 1, wherein the system is one of a smart phone and a smart watch.

8. A method for use by a system including a system processor and a haptic engine stored in a system memory for producing a haptic effect, the method comprising:
    receiving, by the haptic engine being executed by the system processor, a media content having one or more audio or video events;
    obtaining, by the haptic engine being executed by the system processor, at least one of the one or more audio or video events from the media content;
    mapping, by the haptic engine being executed by the system processor, the at least one of the one or more audio or video events to a predetermined haptic effect;
    displaying, by the haptic engine being executed by the system processor, an interface enabling a system user to produce a customized haptic effect based on the predetermined haptic effect mapped to the at least one of the one or more audio or video events; and
    generating, by the haptic engine being executed by the system processor, an output data for causing one of the predetermined haptic effect and the customized haptic effect to occur.

9. The method of claim 8, further comprising saving, by the haptic engine being executed by the system processor, the customized haptic effect as a user determined haptic effect.

10. The method of claim 9, further comprising uploading, by the haptic engine being executed by the system processor, the user determined haptic effect to a haptic effects library accessible over a network.

11. The method of claim 9, further comprising providing, by the haptic engine being executed by the system processor, the output data for use by at least one actuator configured to cause the one of the predetermined haptic effect and the customized haptic effect.

12. The method of claim 8, wherein the system comprises a personal communication device.

13. The method of claim 8, wherein the system is one of a personal computer (PC) and a gaming console.

14. The method of claim 8, wherein the system is one of a smart phone and a smart watch.

15. A computer-readable non-transitory medium having stored thereon instructions, which when executed by a system processor, instantiate a method comprising:
    receiving a media content having one or more audio or video events;
    obtaining at least one of the one or more audio or video events from the media content;
    mapping the at least one of the one or more audio or video events to a predetermined haptic effect;
    displaying an interface enabling a system user to produce a customized haptic effect based on the predetermined haptic effect mapped to the at least one of the one or more audio or video events; and generating an output data for causing one of the predetermined haptic effect and the customized haptic effect to occur.

16. The computer-readable non-transitory medium of claim 15, wherein the method further comprises saving the customized haptic effect as a user determined haptic effect.

17. The computer-readable non-transitory medium of claim 15, wherein the system processor is part of a personal communication device.

* * * * *